US012058084B2

United States Patent
Kovacs et al.

(10) Patent No.: US 12,058,084 B2
(45) Date of Patent: Aug. 6, 2024

(54) CONFIGURATION SCHEME FOR LINK ESTABLISHMENT

(71) Applicant: Intel Corporation, Santa Clara, CA (US)

(72) Inventors: Istvan Kovacs, Hillsboro, OR (US); Samuel A. Johnson, Portland, OR (US); Jonathan D. Turpen, Hillsboro, OR (US); Israel Ben Shahar, Mevaseret Zion (IL)

(73) Assignee: Intel Corporation, Santa Clara, CA (US)

( * ) Notice: Subject to any disclaimer, the term of this patent is extended or adjusted under 35 U.S.C. 154(b) by 946 days.

(21) Appl. No.: 16/781,284

(22) Filed: Feb. 4, 2020

(65) Prior Publication Data

US 2020/0280428 A1    Sep. 3, 2020

Related U.S. Application Data

(60) Provisional application No. 62/923,111, filed on Oct. 18, 2019.

(51) Int. Cl.
| | |
|---|---|
| *G01R 31/28* | (2006.01) |
| *H04L 1/00* | (2006.01) |
| *H04L 5/14* | (2006.01) |
| *H04L 27/26* | (2006.01) |
| *H04W 28/18* | (2009.01) |
| *H04W 76/18* | (2018.01) |

(52) U.S. Cl.
CPC .......... *H04L 5/1438* (2013.01); *H04L 1/0071* (2013.01); *H04L 27/2692* (2013.01); *H04W 28/18* (2013.01); *H04W 76/18* (2018.02)

(58) Field of Classification Search
CPC . H04L 5/1438; H04L 1/0071; H04L 27/2692; H04W 78/18; H04W 28/18
See application file for complete search history.

(56) References Cited

U.S. PATENT DOCUMENTS 11,388,270 B1 *   7/2022  Soma ...................... H04L 69/18
2017/0026241 A1 * 1/2017  Robitaille ........... H04L 41/0853
(Continued)

OTHER PUBLICATIONS

"Low Latency Reed Solomon forward Error Correction", Copyright © 25G/50G Ethernet Consortium Members 2014-2019, http://25gethernet.org/, 18 pages.

(Continued)

*Primary Examiner* — Samir W Rizk
(74) *Attorney, Agent, or Firm* — Compass IP Law PC

(57) ABSTRACT

Examples described herein relate to a physical layer interface device with an interface to a medium and a link controller. The link controller can attempt to form a link with another device through the interface. Based on failure to achieve link using a last successful configuration, an attempt to form a link with another device through the interface can include interleaving use of an IEEE 802.3 compatible auto-negotiation process with at least one attempt to form a link using a non-auto-negotiated mode. Based on failure to achieve link with the another device using any available link speed mode and forward error correction (FEC) scheme, an attempt is made using IEEE 802.3 compatible auto-negotiation without use of Next Pages.

20 Claims, 9 Drawing Sheets

(56) References Cited

U.S. PATENT DOCUMENTS

2018/0026917 A1* 1/2018 Ran .................... H04L 49/3054
  709/228
2019/0327146 A1* 10/2019 Mahadevan ........ H04L 41/0853

OTHER PUBLICATIONS

Booth, Brad, et al., "Auto-Negotiation (AN) Overview", IEEE P802.3BY Task Force—Mar. 2015, 10 pages.
Thaler, Pat, "Clause 49 10GBASE-R PCS", IEEE 802.3ae 10 Gigabit Ethernet Agilent Technologies, Sep. 8, 2000, 5 pages.

* cited by examiner

CONFIGURATION SCHEME FOR LINK ESTABLISHMENT

RELATED APPLICATION

This present application claims the benefit of a priority date of U.S. provisional patent application Ser. No. 62/923,111, filed Oct. 18, 2019, the entire disclosure of which is incorporated herein by reference.

DESCRIPTION

There are a wide variety of Institute of Electrical and Electronics Engineers (IEEE) 802.3 standard (Ethernet) compatible interfaces and configurations. Ethernet communication links formed between network interface devices can use IEEE 802.3 standard compliant and non-standard compliant configurations or configurations not compliant with the most up-to-date version of IEEE 802.3. In general, non-standard compliant configurations can use legacy signaling modes or even proprietary link parameters, such as forward error correction (FEC) modes, to optimize performance. Configuring a device, that complies with or is compatible with the most current version of IEEE 802.3, to achieve link with an interface that does not comply with the same standard involves manual configuration or an automatic link mode detection. Automatic link mode detection may result in introducing a variety of interoperability issues such as where a single connection type can support multiple non-compatible link modes. For example, a 25G direct attach copper cable can support 25GBASE-CR which uses Auto Negotiation to establish link, and can also support 10G SFI which is a forced link mode.

DETAILED DESCRIPTION

Figure 1:
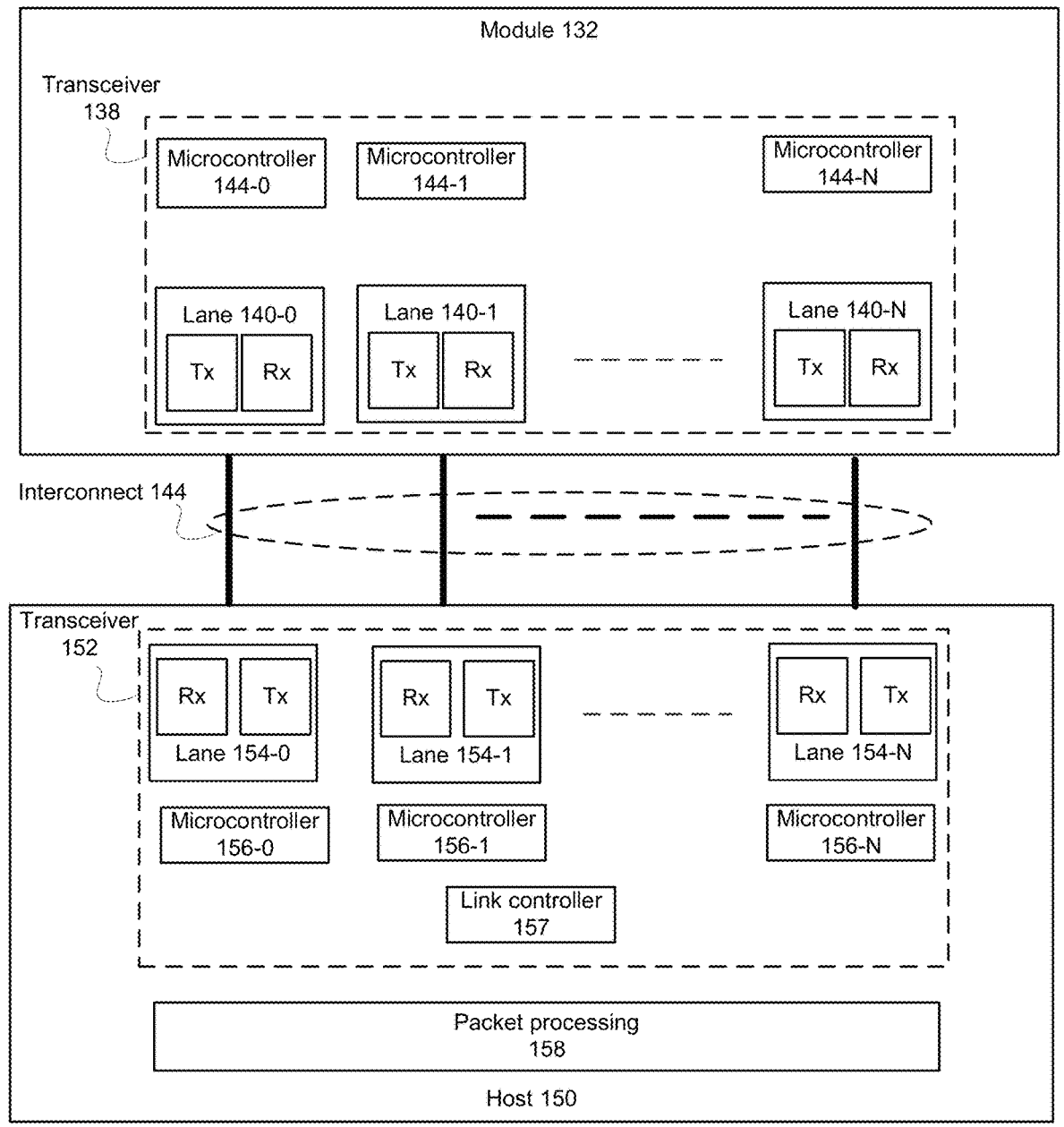
FIG. 1 depicts an example system for communicatively coupling a chip to a module.

As defined in IEEE 802.3 clause 49, a state of link with another interface can occur when a media access control (MAC) layer has resolved fault conditions and there is no Local Fault (if the local physical layer interface (PHY) is not converged) or Remote Fault (link partner PHY is not converged) ordered sets being received by a transmitter or receiver PHY. In addition, a state of link can also involve a physical coding sublayer (PCS) link status to be true, which can be based on PCS Block Lock being true and Hi BER being false. A state of link can occur when transceivers on both ends of the link converge, where the FEC and PCS layers achieve block and frame locks and the MAC layer above them clears all faults and switches to sending idles or data.

In order to achieve link with another interface, some network interfaces rely on attempting link using a set of pre-defined configurations including auto-negotiated link modes as well as non-auto-negotiated (e.g., Attachment Unit Interface (AUI)) link modes. A pre-defined configuration is attempted for a certain amount of time to achieve link, and the network interface continues to another mode until link is established. In order to avoid a scenario where two devices implementing the same link establishment schemes would not reach link, the time allocated for one of the link modes may be longer than a sum of all the other modes to attempt to avoid race conditions where two devices implementing a same loop of link modes are out-of-synch with each other and are not configured to attempt the same link mode at an overlapping time. However, allowing the time allocated for a link mode to be longer than the sum of all the other modes can greatly increase time to link. Moreover, this approach does not eliminate race conditions where link is never achieved if the connected device has implemented a similar method with a different base set of configurations. The approach may also resolve to a non-optimal link configuration, such as a speed lower than the maximum possible.

Various embodiments provide for a network interface automatically detecting a link partner's link speed and FEC configuration. Various embodiments prioritize reaching link through IEEE 802.3 Clause 73 auto-negotiation. If reaching link through IEEE 802.3 Clause 73 auto-negotiation fails, non-negotiated AUI link modes are attempted in decreasing order of speed where, for a speed, use of FEC modes from highest coding gain to lower coding gain are attempted. Prior to attempting linking using a non-negotiated AUI link mode with an FEC mode, IEEE 802.3 Clause 73 auto-negotiation allowing use of Next Page is attempted provided the advertised capabilities include modes defined by the Consortium specifications (e.g., 25G BASE-KR1, 25G BASE-CR1, 50G BASE-KR2 or 50G BASE-CR2). Should the re-attempt at IEEE 802.3 Clause 73 auto-negotiation succeed within a permitted time, a highest speed and fastest available connection can be obtained through auto negotiation. However, should a re-attempt at IEEE 802.3 Clause 73 auto-negotiation fail within a permitted time, the next configured available speed and FEC mode are applied to attempt to achieve link. Should all available configured available speeds and FEC mode fail, IEEE 802.3 Clause 73 auto-negotiation can be attempted again but with no Next Page communications (described herein) such that merely speed and FEC capabilities are advertised.

Should the link not be established within a permitted time, a driver or other management software of a network interface can be informed of link failure. For example, an operating system (e.g., OS) can control available link configurations. The process can be attempted again but with a timer used for IEEE 802.3 Clause 73 auto-negotiation increased to a value that is greater than the sum of all of the other link states in order to ensure that a deadlock does not occur once a properly configured link partner is present and attempt to avoid race conditions described earlier. The sum of all of the other link states can be the sum of individual timeouts allocated to each link mode which will be attempted, there the timeout per link mode is configured based on the per lane baud rate used. Some software or firmware may add more available link speeds and FEC modes for use in a next iteration through available speeds and FEC modes.

Management software, a system administrator, or a remote entity can set and configure application of link speeds and FEC modes. For a set of link modes to attempt, including both auto-negotiated and non-auto-negotiated link modes, the order of link modes to configure is determined. The order can be derived based on their link speed (highest to lowest) and FEC encoding gain (highest to lowest). Coding gain can be a measure of a difference between signal-to-noise ratio (SNR) levels between an uncoded system and coded system reaching the same bit error rate (BER) levels. A time allotted for a type of link mode attempted is configurable. However, in certain cases, for the link mode with highest priority, it may automatically be overridden by the various embodiments.

Various embodiments can be used to configure an Ethernet device for both standard and non-standard link modes, to provide interoperability amongst all possibly connected devices. This may include configuring non-specification compliant FEC mode configurations, such as a No FEC configuration on 25G SR (e.g., 25GBASE-SR) or 100G SR4 (e.g., 100GBASE-SR4) optical modules, which attempt to reduce FEC encoding latency, but do not comply with IEEE 802.3-2018.

Various embodiments provide interoperability between identically configured devices connected back-to-back or directly using electrical or optical cable or medium. Various embodiments provide automatic link detection, intelligent Ethernet link configuration, and optimized link establishment. Various embodiments provide a robust link mode detection and establishment scheme resulting in achieving optimal link parameters such as highest possible link speed at minimum time-to-link. Various embodiments configure a network interface to attempt a connection according to IEEE 802.3 standard-defined ways and also attempt connection in non-standard ways. Various embodiments attempt to detect configuration (e.g., link speed and FEC mode) without using side-band communications.

Various embodiments can be used for pluggable interfaces (e.g., copper or optical), as well as backplane or even chip to chip. Various embodiments can be used in environments where a controlling entity (e.g., network controller's firmware or driver), controls one side of the link. For example, FIG. 1 depicts an example system for communicatively coupling a chip to a module. This example system can provide a chip-to-module (C2M) communications. The system can be used in a network interface, host computing platform, switch, router, interconnect, fabric, rack, server, or any computing or communications device. In other examples, an optical transceiver module can be connected to an interface with multiple electrical links. The system provides for multiple lanes of transmit-receive pairs that can be used to transmit or receive electrical signals between the module and the device. A link can include one or more lanes and a lane can transmit and/or receive a signal. A transmitter of a lane can use an equalizer implemented in an analog circuit to generate an electrical signal for transmission. Equalizer settings can be modified to change weights of current sources. For example, a digital-to-analog converter (DAC) can be used to create signal in the digital domain and output the result in an analog format.

In some example module 132 can include an optical-to-electrical transceiver or electrical-to-electrical transceiver. For example, transmit (TX) module 134 can be used to convert electrical signals to optical format for transmission to an optical medium. Receive (RX) module 134 can convert optical signals received from an optical medium to electrical format.

Modules can be built using a standard mechanical and electrical form factor such as the Small Form-factor Pluggable (SFP), Quad Small Form-factor Pluggable (QSFP), Quad Small Form-factor Pluggable Double Density (QSFP-DD), Micro QSFP, or OSFP (Octal Small Format Pluggable) interfaces, described in Annex 136C of IEEE Std 802.3cd-2018 and references therein, or other form factors.

Transceiver 138 can be used for electrical signal transmission and receipt between module 132 and host device 150. Transceiver 138 can provide multiple transmit and receive lanes for electrical signal communication between module 132 and host device 150. For example, lanes 140-0 to 140-N can provide transmit and receive circuitry for coupling with receive and transmit circuitry of lanes 154-0 to 154-N of host device 150. Lanes 140-0 to 140-N and lanes 154-0 to 154-N can provide serializer/deserializer (SerDes) formatting of signals.

Module 132 can be communicatively coupled to host 150 by an interconnect 144. Interconnect 144 can be electrical signal conductors that couple pins or holes of lane 140-0 to 140-N of a pluggable module 132 to holes or pins associated with lanes 154-0 to 154-N of host 150. Host 150 can transmit or receive signals in electrical format to or from module 132. In some examples, module 132 provides optical communications to and from any optical medium for host 150.

Host 150 can include transceiver 152 for communication with module 132. Transceiver 152 can include lanes 154-0 to 154-N where any of lanes 154-0 to 154-N includes receive and transmit circuitry. Any microcontroller 156-0 to 156-N can be used to manage operation of its lane. For example, a single microcontroller can manage equalizer settings of several lanes. In some examples, link controller 157 or any microcontroller 144-0 to 144-N or 156-0 to 156-N can be used to manage link establishment with a link partner in accordance with embodiments described herein. Link controller 157 can be part of a physical layer interface (PHY) or media access controller (MAC). For example, at least, a common supported link speed and FEC mode can be negotiated and applied between module 132 and host 150.

Various embodiments prioritize IEEE 802.3 Clause 73 auto-negotiation over non-auto-negotiated link modes such that auto-negotiated link modes are interleaved or attempted before some or all attempts using non-auto-negotiated link modes in decreasing order of priority based on speed and coding gain. Auto-negotiated link mode can occur for an amount of time to receive a base page. IEEE 802.3-2018 and its Clause 73 relating to auto-negotiation are hereby incorporated by reference in its entirety. Auto-negotiation can refer to one or more of: a base page exchange advertise capabilities (e.g., link speed (e.g., 1000BASE-KX, 10GBASE-KX4, 100GBASE-CR4, and so forth), FEC mode, pause capability, and so forth). In addition, Next Page exchange can be used, for example, to advertise IEEE capabilities as well as non-IEEE capabilities such as the Ethernet Consortium modes.

When link is attempted for the first time after a link down event, if the last successfully used link mode was an AUI link mode, then after attempting potential auto-negotiated link modes, the last known successful AUI link mode can be attempted. If the link establishes, then the link controller 157 stores the successful AUI link mode (e.g., speed and FEC mode), and stops attempting a link. If link establishment is unsuccessful, the configured AUI link modes can be attempted in decreasing order of priority determined based on their speed.

To potentially reduce time to link and attempt to prevent identically configured devices connected back- to back (e.g., directly) from establishing a link, after each attempted AUI mode, the auto-negotiated link modes can be attempted for a short period of time, e.g., hundreds of milliseconds or long enough to determine if there is a connected link partner transmitting auto-negotiation Base Pages. Base Pages are defined at least in IEEE 802.3-2018, Clause 73. If Base Pages are being received, the device will stay in this state and bring up link through auto negotiation. This behavior can lead to a reduced time to link with all freshly connected or configured auto-negotiation enabled link partners relative to attempting all possible PHY configurations prior to reconfiguring the PHY for auto negotiation. Various embodiments can avoid interoperability issues due to receiver convergence failure in the link partner by enforcing loss of signal between attempting different FEC modes on the same link mode. Enforcing loss of signal can occur where a PHY is not receiving any signal for some period of time. Enforcing loss of signal can be an intentional event that forces auto-negotiation of operating capabilities. For example, enforcing loss of signal can include switching to auto-negotiation which disables transmit and is perceived as a link drop on the other side and will act as a reset which can help clear issues resulting from matching baud rate but different FEC encoding.

Various types of connector interfaces can be supported such as xAUI, media-independent interface (MII) (including GMII or XGMII), and others.

In some examples, if the device being configured is capable of providing a reliable signal detection indication, link controller 157 can wait for a received signal to be detected before beginning to attempt a configured link mode.

If all available link modes were attempted and link was not achieved, to accommodate auto-negotiation capable link partners which do not support Next Pages, link controller 157 can attempt use of link modes involving the use of Next Pages are removed from the list of modes advertised through auto-negotiation. For an example of Next Page messages, see Annex 28C of IEEE 802.3-2018.

After all available configurations have been attempted a Parallel Detect fault is flagged (but is cleared any time that link is successfully established). Note that "Parallel Detect" is an IEEE 802.3 name for attempting to recognize a non Auto-Negotiation signal being received when the PHY is configured for Auto Negotiation that is supported in 1GBASE-KX and 10GBASE-KX4. If configured in a Parallel Detect fault condition, link controller 157 can extend a timeout value for the highest priority link mode (or any link mode) to be the sum of the time allowed for all enabled link modes to attempt to avoid a race condition described earlier. Devices that apply the same link modes in the same order but which are out of synch with each other may not establish link if a link mode is attempted for less than half of the amount of time to complete the entire loop. Setting a highest priority link mode (e.g., Auto-negotiation) to be enabled for more than half the time available to check all link states can attempt to achieve both devices applying a same link mode at the same time.

Link controller 157 returns to the highest priority link mode and attempts to achieve link by attempting an auto-negotiated link mode before attempting non-auto-negotiated link modes in decreasing order of priority based on speed and coding gain. If link is not established without use of Next Pages, the removed link modes can be advertised via Next Pages in the next attempt at auto-negotiated link mode. Accordingly, link controller 157 can also support media where multiple link modes are supported but none of them are supported by Clause 73 Auto Negotiation, such as the case of multi-speed optical modules.

Although, the example is shown for chip to module (C2M) connection, an outer PHY can connect to another chip for a chip-to-chip (C2C) connection. For example, transceiver 152 can provide a chip-to-chip interface for C2C communications.

Packet processing 158 can perform processing of received packets such as one or more of: media access control, any protocol layer processing, determination if a packet is valid (e.g., correct Ethernet type, correct checksum, correct IP Protocol type, valid layers 4-7 protocol type), determination of packet destination (e.g., next hop, destination queue), match-action activity, or perform one or more of: IP filter checks, flow table lookup, access control lists (ACL), firewall, match-actions operations, outgoing port selection using a forwarding table, packet decryption, packet encryption, denial of server protection, packet counting, billing, traffic management/conditioning, traffic shaping/traffic scheduling, packet marking/remarking, packet inspection of layers 4-7, or traffic load balancing/load distribution. For example, packet processing process can perform Data Plane Development Kit (DPDK) or OpenDataPlane (ODP) compatible packet processing.

Figure 2A:
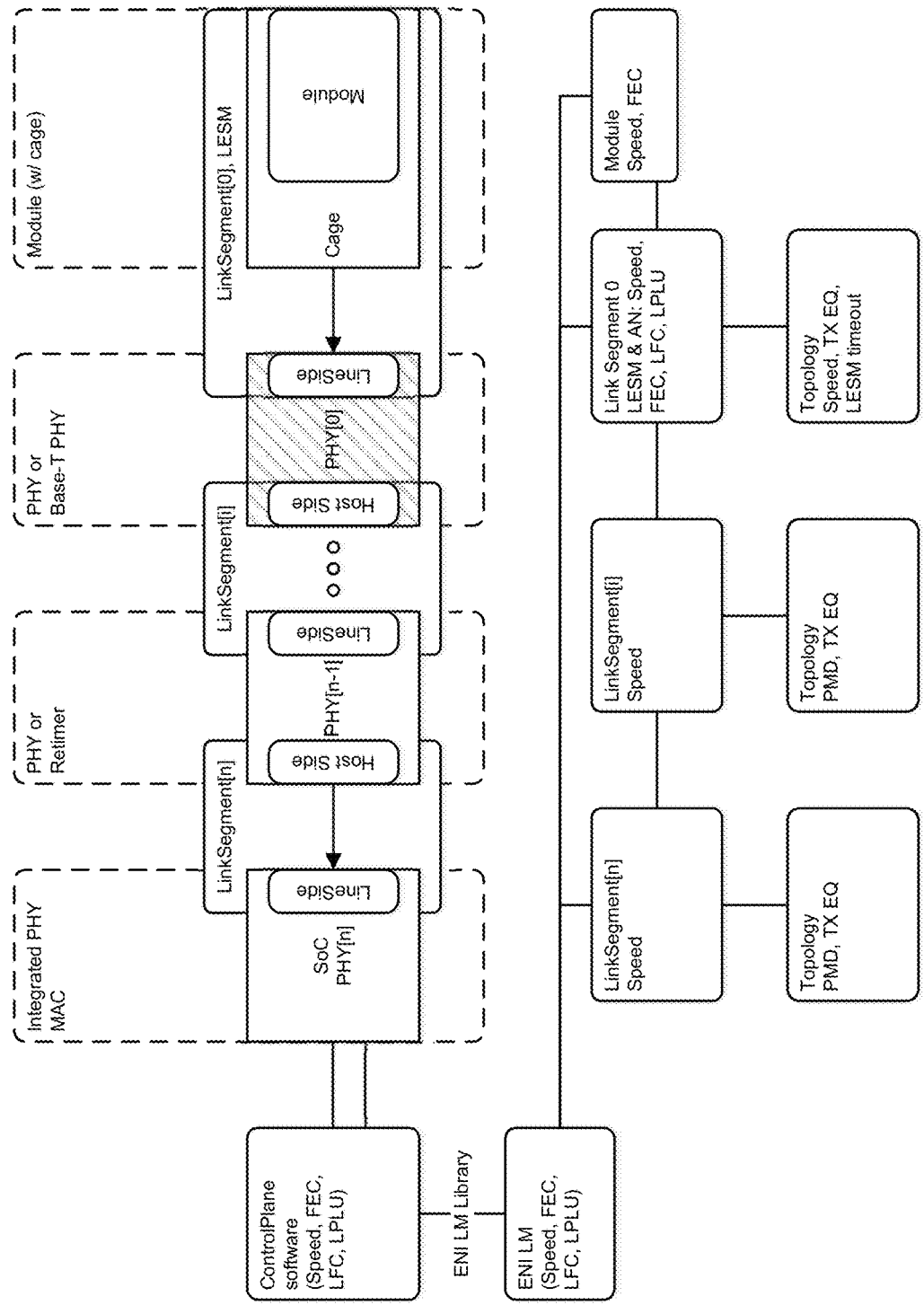
FIG. 2A depicts an example transceiver chain.

FIG. 2A depicts an example transceiver chain. A chain of PHYs are used to connect a system to a link partner (e.g., module), PHY[0] is the line side of the PHY which connects to the link partner. A PHY[0] receives a directly attached electrical or optical cable connected to link partner and is an outer boundary of a PHY ("outer PHY") that provides connection with a link partner module. PHY[0] can use various embodiments described herein to attempt to achieve link with a PHY[n−1]. In other embodiments, PHY[0] can use embodiments described herein to attempt to achieve link with a PHY of another host device such as another network interface or switch. In this example, LFC represents link flow control; LPLU represents low power link up, whereas ENI LM represents Ethernet Network Interface Link Management.

The module can represent an electrical or optical module that includes an optical signal transceiver and is coupled to PHY[0]. Various small form-factor pluggable (SFP) module specifications and associated speeds such as SR/LR/SX/LX varieties can be supported. Various cables can be connected to the module, such as: Direct Attach Copper Twinax Cable (DAC), active optical cable (AOC), active copper cable (ACC), or unshielded twisted pair cable (UTP).

Figure 2B:
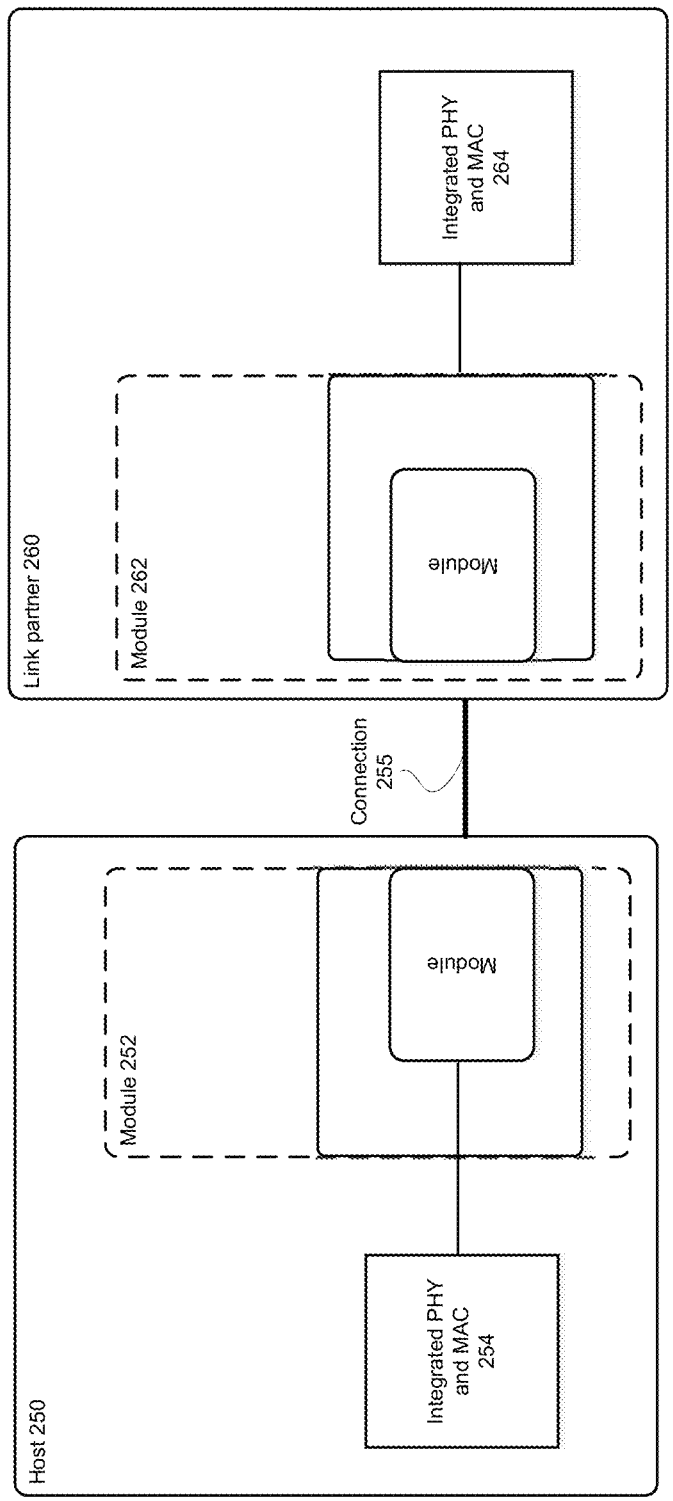
FIG. 2B depicts an example of a set of link partners.

FIG. 2B depicts an example of a set of link partners. Host 250 uses a module 252 (e.g., electrical or optical) to communicate with a module 262 (e.g., electrical or optical) used by link partner 260. An integrated PHY and MAC 254 of host 250 can communicate with integrated PHY and MAC 264 of link partner 260 using a connection 255 (e.g., electrical connection, optical connection) and perform link speed and FEC mode to apply in accordance with embodiments described herein. Connection 255 can be any of a cable, backplane, or chip-to-chip connection. However, PHY and MAC in either host 250 or link partner 260 can be disaggregated and need not be formed on a system on chip (SoC).

Figure 3:
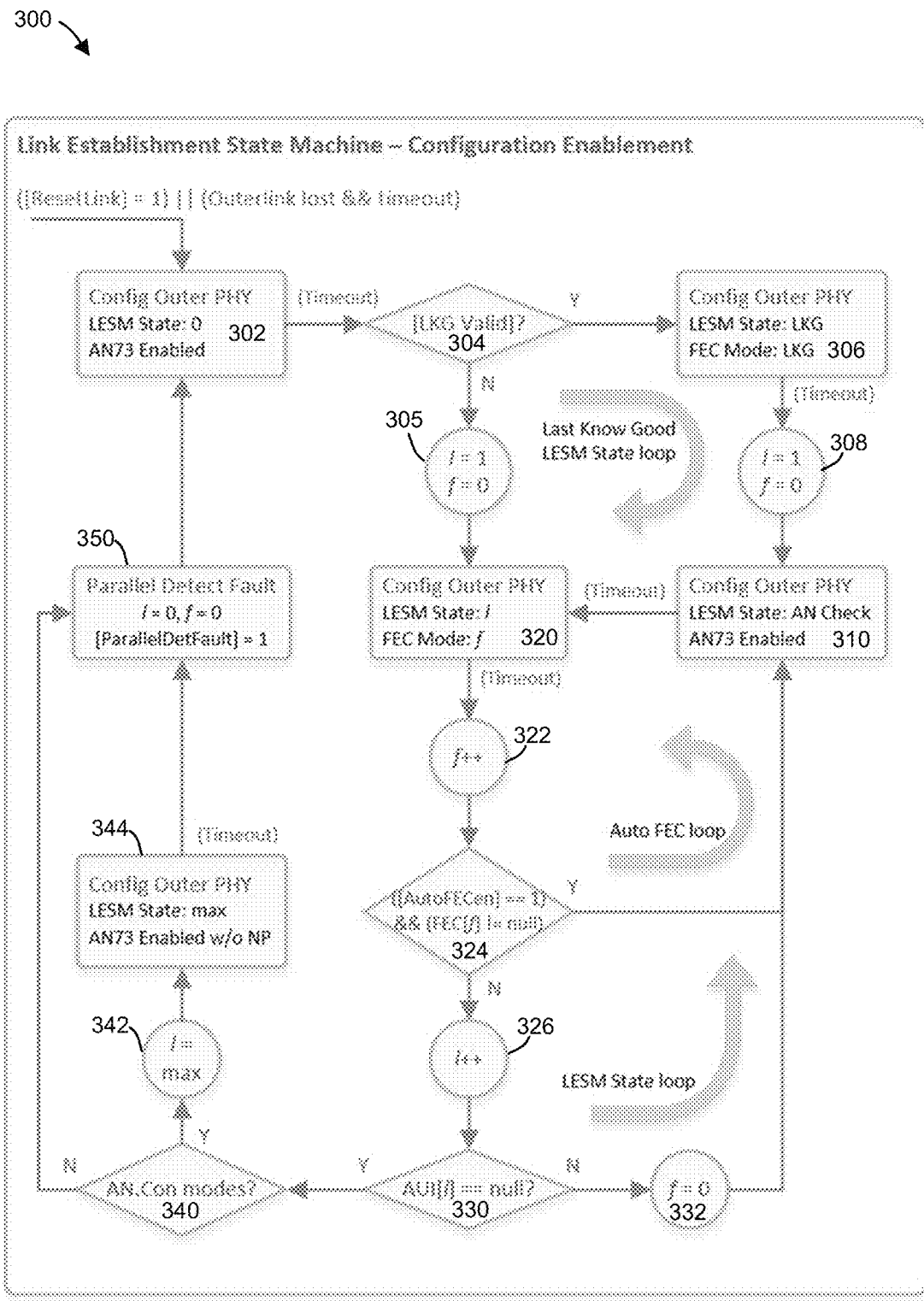
FIG. 3 illustrates a process to configure a link between link segments based on a set of link modes to attempt.

FIG. 3 illustrates a process to configure a link between link segments based on a set of link modes to attempt. The process can be performed by a controller in a host or network interface of at least link speed and FEC capabilities of a physical layer interface (PHY) and/or media access controller (MAC). Loss of link by a PHY with a link partner causes the process to commence at 302. Link establishment state mode (LESM) refers to a current link mode configuration, indexed among all allowed and enabled link modes by the variable "I". At 302, the PHY is configured to use LESM State I=0, which refers to IEEE 802.3 Clause 73

Auto-Negotiation configuration with Next Page use enabled. Under Auto-Negotiation, at least available speeds and FEC capabilities are advertised with one or more link partners.

If link can be established within a time limit using Auto-Negotiation, the process ends. If there is an expiration of a timer before the link is established, a "Timeout" occurs at the process continues to 304. The timeout value for each LESM state may be configurable to allow for different receiver convergence time requirements per PHY Type (e.g., specification defined physical layer interfaces such as 25GBASE-CR, 25GBASE-CR1, 25G AUI with RS FEC, and so forth) or speed. Time to achieve link can vary greatly. For example, to achieve link, 10G SFI Linear may take less than 150 ms, 25GBase-KR may take less than 500 ms, 50GBase-KR (PAM4) may take less than 3.2 s, whereas 10GBase-T sometimes may take longer than 20 seconds.

At 304, a determination is made if an LKG LESM state is valid. In other words, a determination is made as to whether there are link parameters of a successful prior link between the PHY and another PHY that is valid. Link parameters may be invalid if the link configuration or the media used to connect the link partners has changed, and the previously used configuration is no longer enabled or no longer valid on the connected media. In some examples, an LKG configuration has at least link speed (l) and FEC mode (f) indexes or values that identify the successful link speed and FEC mode for the successful link and is a previous link configuration which successfully achieved link without using IEEE 802.3 Clause 73 Auto Negotiation.

However, if at 304 an LKG setting is determined to be invalid, the process continues to 305, where LESM state (l) is set to 1 and FEC mode (f) is set to 0. FEC mode f=0 uses a highest priority FEC mode (e.g., highest encoding gain with best signal reproduction integrity). The process continues to 320.

At 304, if there is determination of availability of a valid LKG, then the process continues to 306. At 306, the valid LKG link speed and FEC mode are applied subject to a timer. The timer can be set as depending on the PHY. In some examples, the timer value can be 300 ms or less, although other values can be used. If the LKG configuration with a link partner achieves link within a time limit, then the LKG configuration is stored as a valid configuration and the process ends. A Parallel Detect Fault indication is reset to 0 after a link is established.

If a link is not achieved in the time limit, the process continues to 308 where the PHY is configured with l=1 and FEC mode of f=0. A loop proceeds that includes 310, 320, 322, and 324 whereby different FEC modes for a particular link speed mode 1 are tried. However, prior to attempting a link speed and FEC mode, at 310, an IEEE 802.3 Clause 73 Auto Negotiation is applied to attempt to achieve link. If link is achieved within a time limit, the process ends and the applied settings are saved as valid LKG. However, if link is not achieved within a time limit (e.g., before timer expiration), the process continues to 320. In some example, the timer values applied for 306 and 310 can be the same.

In some examples, an order of applied link speed (1) and FEC modes (f) modes are as identified in the table below. Link modes can be ordered from highest speed to lowest speed. FEC modes can be ordered from highest priority FEC mode to lowest FEC mode.

TABLE 1

| | Auto-negotiation | Speed | Physical Medium Dependent (PMD) type | Default FEC mode | Auto FEC modes |
|---|---|---|---|---|---|
| Option 0 | Clause 73 | 25 G | 25GBase-CR | RS528/KR/No-FEC | N/A |
| | | 25 G | 25GBase-CR1 | RS528/KR/No-FEC | |
| | | 25 G | 25GBase-CR-S | KR/No-FEC | |
| Option 1 | N/A | 25 G | 25G-AUI-C2C | RS528/KR/No-FEC | RS528/KR/No-FEC |
| Option 2 | N/A | 10 G | 10G-SFI-C2C | NoFEC | No FEC |
| Option 3 | N/A | 1 G | 1G-SGMII | NoFEC | No FEC |

Option 0 (1=0) is Clause 73 Auto-Negotiation (AN) where secondary arbitration mechanism has all AN states advertised (e.g., advertise all PMD type and FEC modes in one operation).

Option 1 (1=1) has a speed of 25G but AN is not enabled. Option 1 can be used for a point-to-point fixed configuration. The available FEC modes are f=0 (Reed Solomon (RS) 528), f=1(KR), and f=2(No FEC).

Option 2 (1=2) has a speed=10G with no FEC options. Some short link channels use optical modules that provide acceptable bit error rate (BER) so FEC is not used.

In some examples, FEC modes include but are not limited to: IEEE 802.3 Clause 74 Firecode FEC, IEEE 802.3 Clause 91 Reed Solomon FEC, IEEE 802.3 Clause 108 Reed Solomon FEC, Consortium Low Latency Reed Solomon FEC (e.g., 25G/50G Ethernet Consortium specification (2018)), or No FEC (disabled).

At 320, if the PHY achieves link with its link partner within a time limit, the process ends. However, at 320, if the PHY fails to achieve link with its link partner within a time limit, the process continues to 322. At 322, the f mode is increased to a next FEC mode for the current link mode. For example, for link mode of l=1, FEC mode 0, f=0, is RS 528; FEC mode, f=1, is KR; and FEC mode, f=2 is no FEC.

At 324, a determination is made as to whether AutoFECen is true and the FEC mode is not null. AutoFECen can be a Boolean variable indicating whether or not the process should enable all available FEC modes or just the highest priority FEC mode (f=0). If both conditions are true, then the process continues to 310 for the incremented f value. However, if AutoFECen is not enabled or there are no other FEC mode is untried for a current link mode, the process continues to 326. For example, for a second iteration for an l=1 mode, f=1. For a third iteration for an l=1 mode, f=2, and so forth. In the examples of the Table 1, for link mode 1=1, auto FEC is enabled and there are multiple FEC modes. However, for the link modes 1=2 and 1=3, in Table 1, auto FEC is not enabled and the process continued to 326.

At 326, the link mode is increased to a next available link mode and the process continues to 330. At 330, a determination is made if a next non-negotiated AUI link mode is null, which indicates there is another link mode that has not been tried. If there is another link mode to attempt, then the process continues to 332. At 332, a first FEC mode to try for a link mode is selected. For example, a first FEC mode can be a highest priority FEC mode with highest coding gain. The process continues to 310 and the iteration of 310, 320, 322, 324, 326, 330, and 332 repeat to find a link mode and FEC mode that achieves link within an applicable time limit. If a link is achieved, the process ends and the applied link and FEC modes are stored as a valid LKG mode. Parallel Detect Fault indication is reset to 0 after a link is established.

At 330, if all available link modes and FEC modes are tried and no link is achieved in the applicable time limit and, the process continues to 340. At 340, a determination is made as to whether Ethernet Auto Negotiation consortium modes are supported by the subject PHY. If any Ethernet Consortium modes are enabled through Auto Negotiation, they are enabled using Auto Negotiation Next Pages. Next Pages are described in IEEE 802.3 and provide a manner through IEEE AN that allows consortiums to communicate information to devices that support consortium capability. If Ethernet Auto Negotiation consortium modes are supported, the process continues to 342. If Ethernet Auto Negotiation consortium modes are not supported, the process continues to 350.

At 342, the LESM mode, 1, is set to a "maximum" available variant. A maximum available variant can refer to IEEE 802.3 Clause 73 Auto Negotiation without use of Next Pages. At 344, the outer PHY can be configured to use IEEE 802.3 Clause 73 Auto Negotiation configuration but without use of Next Pages during auto negotiation (all configurations requiring Auto Negotiation Next Pages are disabled). Not sending Next Pages provides for auto negotiation of link speed and FEC. In some examples, Next Pages can be used to exchange identifier tags, Energy Efficient Ethernet (EEE) parameters, operating parameters and vendor specific information. Some early consortium compatible devices do not implement handlers for processing Next Pages and those consortium devices may not establish link if Next Pages are transferred. Not sending Next Pages allows the outer PHY to link with early consortium devices or devices that may not process Next Pages. Not using Next Pages can attempt to resolve an interoperability issue where a non-specification compliant link partner might not support using Next Pages, which may have caused the previously attempted Auto Negotiations allowing use of Next Pages to fail.

If link is achieved using Auto Negotiation without use of Next Pages before a timer expires, the process ends. If link is not achieved using Auto Negotiation without use of Next Pages before a timer expires, the process continues to 350.

At 350, a Parallel Detect Fault indicator is set to indicate to a link establishment has failed. Parallel Detect Fault indicator can be sent to a software stack so that a network interface device driver identifies that a link has failed and some software or firmware may use the information, for example, to adjust a manner of attempting link with another device. Software (e.g., driver or operating system), hardware, or firmware detects that all available link and FEC configurations for establishing link have failed. Parallel Detect Fault indicates that all LESM states have been attempted without successfully establishing link. In the event of a Parallel Detect Fault, the LESM State 0 timer (used for a duration of IEEE 802.3 Clause 73 Auto Negotiation) is increased to a value that is greater than the sum of all of the other LESM States in order to ensure that a deadlock does not occur once a properly configured link partner is present.

In some examples, a software (e.g., driver or operating system) or firmware may add more LESM states for use in a next iteration of the process of FIG. 3. For example, additional link speeds and/or FEC modes can be added to try to achieve link. The process continues to 302 with an adjusted timer of a duration of permitted application of IEEE 802.3 Clause 73 Auto Negotiation. Process 300 can repeat one or more times with either a bounded number of repeats or unbounded number of repeats. However, process 300 can stop based on a command from upper software or firmware layers to abort.

The following provides an example of timer or time out values that can be used for illustration but any values can be selected. A Number of PHY configurations is AN+3 AUI configurations. A number of FEC configurations is 2 per AUI configuration. LESM State 0 timeout can be 6 seconds whereas LESM States 1, 2 and 3 timeouts can be 2 seconds. The AN Good check timer can be 300 ms.

| State | Example Time spent in State | Note |
| --- | --- | --- |
| 302: AN Config, LESM State 0 | 6 sec | |
| 306: LKG config | 2 sec | If LKG configuration exists |
| 310: AN Check | 300 ms | |
| 320: LESM State 1, FEC config 0 | 2 sec | |
| 310: AN Check | 300 ms | |
| 320: LESM State 1, FEC config 1 | 2 sec | |
| 310: AN Check | 300 ms | |
| 320: LESM State 2, FEC config 0 | 2 sec | |
| 320: LESM State 3, FEC config 1 | 2 sec | |
| 344: AN w/o Next Page, LESM State 5 | 6 sec | If LESM State 0 included configs requiring Next Pages |
| 350: Parallel Detect Fault | — | Flag that no link was found after attempting all link modes |
| 302: AN Config, LESM State 0 | 18 sec* | LESM State 0 timer extended due to Parallel Detect Fault |

| State | Example Time spent in State | Note |
|---|---|---|
| 320: LESM State 1, FEC config 0 | 2 sec | LKG cleared when Parallel Detect Fault occurs, so go straight to next LESM state |
| 310: AN Check | 300 ms | |
| 320: LESM State 1, FEC Config 1 | 2 | |

*18 seconds calculated by adding LESM state 0 timer (6 seconds) with time spent in all AUI configs (3 PHY configs * 2 FEC configs * 2 seconds). Loop time could be 30 seconds, and 18 seconds is spent in AN, which can avoid a race condition described earlier.

An example sequence of applied link and FEC modes is provided next. In this example sequence, link is not established even after all configured link speed and FEC modes are attempted.

| L[1] | LKG [time out] |
|---|---|
| L[0] | AN73 |
| L[1]F[0] | speed[1]w/speed[1].fec[0] |
| L[0] | AN73 |
| L[1]F[1] | speed[1]w/speed[1].fec[1] |
| L[0] | AN73 |
| L[2]F[0] | speed[2]w/speed[1].fec[0] |
| L[0] | AN73 |
| L[3]F[0] | speed[3]w/speed[3].fec[0] |
| L[0] | AN73 |
| L[3]F[1] | speed[3]w/speed[3].fec[1] |
| L[0] | AN73 |
| L[3]F[2] | speed[3]w/speed[3].fec[2] |
| L[0] | AN73 |
| L[3]F[3] | speed[3]w/speed[3].fec[3] |

In this example sequence, link is not achieved despite use of link mode 0, link mode 1 with FEC modes 0 and 1, link mode 2 with FEC mode 0, and link mode 3 with FEC modes 0-3.

Another example sequence of applied link and FEC modes is provided next. In this example sequence, link is not established even after all configured link speed and FEC modes are attempted.

| L[1] | LKG [time out] |
|---|---|
| L[0] | AN73 |
| L[1]F[0] | speed[1]w/speed[1].fec[0] |
| L[0] | AN73 |
| L[1]F[0] | speed[1]w/speed[1].fec[1] |
| L[0] | AN73 |
| L[2]F[0] | speed[2]w/speed[1].fec[0] |
| L[0] | AN73 |
| L[3]F[0] | speed[3]w/speed[3].fec[0] |
| L[0] | AN73 |
| L[3]F[1] | speed[3]w/speed[3].fec[1] |
| L[0] | AN73 |
| L[3]F[2] | speed[3]w/speed[3].fec[2] |
| L[0] | AN73 |
| L[3]F[3] | speed[3]w/speed[3].fec[3] |

In this example sequence, link is not achieved despite use of link mode 0, link mode 1 with FEC mode 0, link mode 2 with FEC mode 0, and link mode 3 with FEC modes 0-3.

Figure 4:
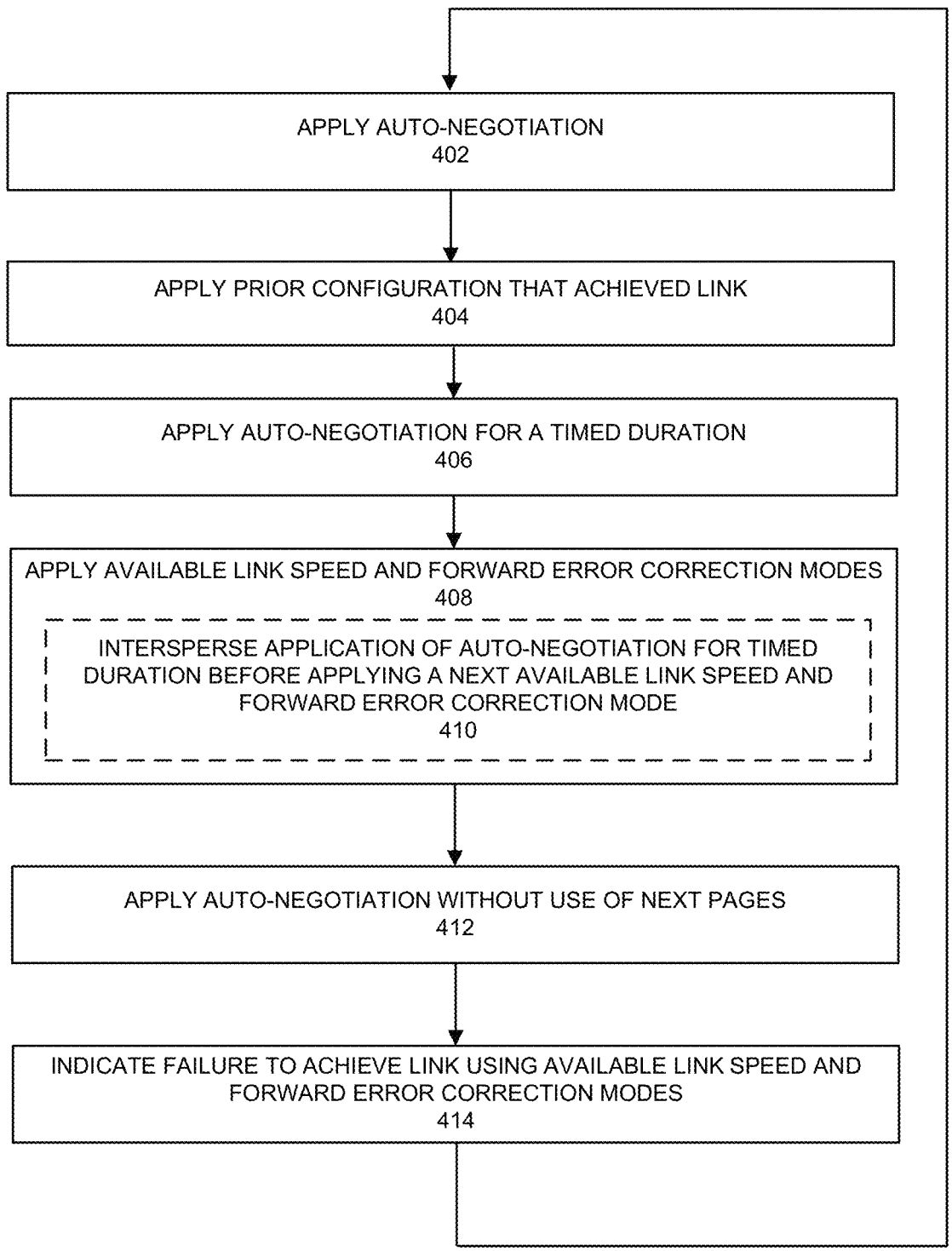
FIG. 4 depicts an example process.

FIG. 4 depicts an example process. The process can be performed by a media access control device, physical layer interface, microprocessor, or microcontroller to attempt to achieve link status with a link partner. At 402, IEEE 802.3 Clause 73 Auto-Negotiation is applied. In the event of successfully achieving link status (not depicted), the link speed, and FEC configuration are saved and Parallel Detect Fault state is cleared and the Auto-Negotiation timer is reset to its default (not shown). Based on failure of the applied Auto-Negotiation to achieve link within a time limit, the process continues to 404.

At 404, a prior configuration that achieved link is applied for a duration. In the event of successfully achieving link status (not depicted), the link speed, and FEC configuration are saved and Parallel Detect Fault state is cleared and the Auto-Negotiation timer is reset to its default (not shown). Based on failure of the applied Auto-Negotiation to achieve link within a time limit, the process continues to 406.

At 406, Auto-Negotiation is applied for an Auto-Negotiation timer duration. In the event of successfully achieving link status (not depicted), the link speed, and FEC configuration are saved and Parallel Detect Fault state is cleared and the Auto-Negotiation timer is reset to its default (not shown). Based on failure to achieve link state within a time limit, the process continues to 408.

At 408, iteration occurs for all available link speed modes and corresponding available FEC mode configurations. In the event of successfully achieving link status (not depicted), the applied link speed, and FEC configuration are saved and Parallel Detect Fault state is cleared and the Auto-Negotiation timer is reset to its default (not shown). If any applied link speed and FEC configuration fails to achieve link, 410 occurs whereby application of IEEE 802.3 Clause 37 Auto-Negotiation is interspersed with next available link speed and FEC mode. Link speed modes can be attempted from highest link speed to lowest speed. For each link speed, FEC modes can be attempted from most coding gain to least coding gain. Coding gain can measure a difference between signal-to-noise ratio (SNR) levels between uncoded and coded systems to reach the same bit error rate (BER) levels using forward error correction (FEC). If application of all available link speed(s) and FEC mode(s) fail to achieve link, then 412 follows.

At 412, as no available link speed mode and FEC mode configurations were successful, IEEE 802.3 Clause 37 Auto-Negotiation is attempted without use of Next Pages. In the event of successfully achieving link status (not depicted), the applied link speed, and FEC configuration are saved and Parallel Detect Fault state is cleared and the Auto-Negotiation timer is reset to its default (not shown). Should Auto-Negotiation attempted without use of Next Pages fail, the process continues to 414, where a Parallel Detect Fault is indicated to management software, the is timer for subsequent uses of IEEE 802.3 Clause 37 Auto-Negotiation is increased and the process returns to 402.

Figure 5:
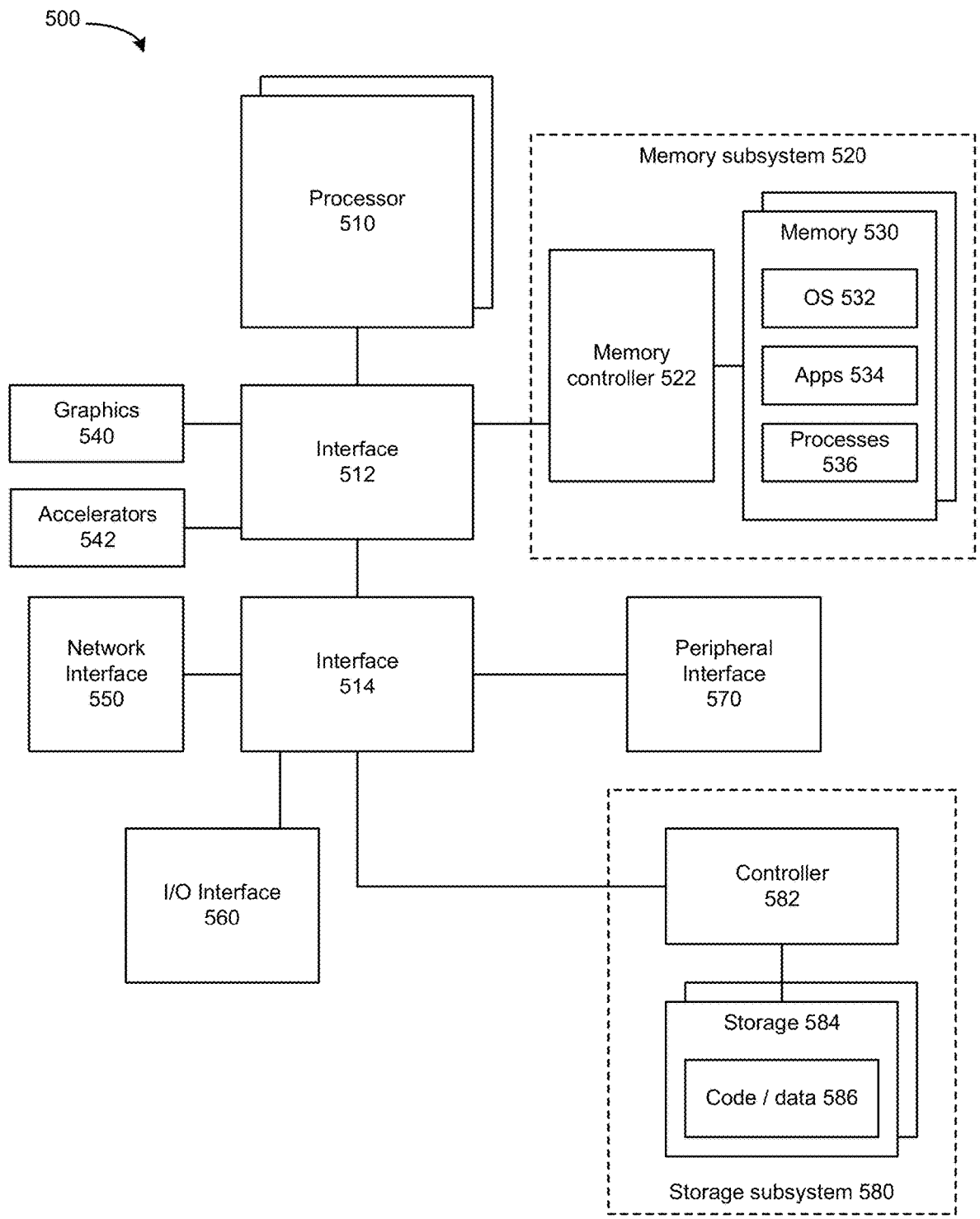
FIG. 5 depicts an example system.

FIG. 5 depicts an example system. The system can use embodiments described herein to configure a network interface (e.g., network interface 550) or switch to select a manner of attempting to link with another device in accordance with embodiments described herein. System 500 includes processor 510, which provides processing, operation management, and execution of instructions for system 500. Processor 510 can include any type of microprocessor, central processing unit (CPU), graphics processing unit (GPU), processing core, or other processing hardware to provide processing for system 500, or a combination of processors. Processor 510 controls the overall operation of system 500, and can be or include, one or more programmable general-purpose or special-purpose microprocessors, digital signal processors (DSPs), programmable controllers, application specific integrated circuits (ASICs), programmable logic devices (PLDs), or the like, or a combination of such devices.

In one example, system 500 includes interface 512 coupled to processor 510, which can represent a higher speed interface or a high throughput interface for system components that uses higher bandwidth connections, such as memory subsystem 520 or graphics interface components 540, or accelerators 542. Interface 512 represents an interface circuit, which can be a standalone component or integrated onto a processor die. Where present, graphics interface 540 interfaces to graphics components for providing a visual display to a user of system 500. In one example, graphics interface 540 can drive a high definition (HD) display that provides an output to a user. High definition can refer to a display having a pixel density of approximately 100 PPI (pixels per inch) or greater and can include formats such as full HD (e.g., 1080p), retina displays, 4K (ultra-high definition or UHD), or others. In one example, the display can include a touchscreen display. In one example, graphics interface 540 generates a display based on data stored in memory 530 or based on operations executed by processor 510 or both. In one example, graphics interface 540 generates a display based on data stored in memory 530 or based on operations executed by processor 510 or both.

Accelerators 542 can be a fixed function offload engine that can be accessed or used by a processor 510. For example, an accelerator among accelerators 542 can provide compression (DC) capability, cryptography services such as public key encryption (PKE), cipher, hash/authentication capabilities, decryption, or other capabilities or services. In some embodiments, in addition or alternatively, an accelerator among accelerators 542 provides field select controller capabilities as described herein. In some cases, accelerators 542 can be integrated into a CPU socket (e.g., a connector to a motherboard or circuit board that includes a CPU and provides an electrical interface with the CPU). For example, accelerators 542 can include a single or multi-core processor, graphics processing unit, logical execution unit single or multi-level cache, functional units usable to independently execute programs or threads, application specific integrated circuits (ASICs), neural network processors (NNPs), programmable control logic, and programmable processing elements such as field programmable gate arrays (FPGAs).

Accelerators 542 can provide multiple neural networks, CPUs, processor cores, general purpose graphics processing units, or graphics processing units can be made available for use by artificial intelligence (AI) or machine learning (ML) models. For example, the AI model can use or include any or a combination of: a reinforcement learning scheme, Q-learning scheme, deep-Q learning, or Asynchronous Advantage Actor-Critic (A3C), combinatorial neural network, recurrent combinatorial neural network, or other AI or ML model. Multiple neural networks, processor cores, or graphics processing units can be made available for use by AI or ML models.

Memory subsystem 520 represents the main memory of system 500 and provides storage for code to be executed by processor 510, or data values to be used in executing a routine. Memory subsystem 520 can include one or more memory devices 530 such as read-only memory (ROM), flash memory, one or more varieties of random access memory (RAM) such as DRAM, or other memory devices, or a combination of such devices. Memory 530 stores and hosts, among other things, operating system (OS) 532 to provide a software platform for execution of instructions in system 500. Additionally, applications 534 can execute on the software platform of OS 532 from memory 530. Applications 534 represent programs that have their own operational logic to perform execution of one or more functions. Processes 536 represent agents or routines that provide auxiliary functions to OS 532 or one or more applications 534 or a combination. OS 532, applications 534, and processes 536 provide software logic to provide functions for system 500. In one example, memory subsystem 520 includes memory controller 522, which is a memory controller to generate and issue commands to memory 530. It can be understood that memory controller 522 could be a physical part of processor 510 or a physical part of interface 512. For example, memory controller 522 can be an integrated memory controller, integrated onto a circuit with processor 510.

While not specifically illustrated, it can be understood that system 500 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect (PCI) bus, a Hyper Transport or industry standard architecture (ISA) bus, a small computer system interface (SCSI) bus, a universal serial bus (USB), or an Institute of Electrical and Electronics Engineers (IEEE) standard 1394 bus (Firewire).

In one example, system 500 includes interface 514, which can be coupled to interface 512. In one example, interface 514 represents an interface circuit, which can include standalone components and integrated circuitry. In one example, multiple user interface components or peripheral components, or both, couple to interface 514. Network interface 550 provides system 500 the ability to communicate with remote devices (e.g., servers or other computing devices) over one or more networks. Network interface 550 can include an Ethernet adapter, wireless interconnection components, cellular network interconnection components, USB (universal serial bus), or other wired or wireless standards-based or proprietary interfaces. Network interface 550 can transmit data to a device that is in the same data center or rack or a remote device, which can include sending data stored in memory. Network interface 550 can receive data from a remote device, which can include storing received data into memory. Various embodiments can be used in connection with network interface 550, processor 510, and memory subsystem 520.

In one example, system 500 includes one or more input/output (I/O) interface(s) 560. I/O interface 560 can include one or more interface components through which a user interacts with system 500 (e.g., audio, alphanumeric, tactile/touch, or other interfacing). Peripheral interface 570 can include any hardware interface not specifically mentioned above. Peripherals refer generally to devices that connect dependently to system 500. A dependent connection is one where system 500 provides the software platform or hardware platform or both on which operation executes, and with which a user interacts.

In one example, system 500 includes storage subsystem 580 to store data in a nonvolatile manner. In one example, in certain system implementations, at least certain components of storage 580 can overlap with components of memory subsystem 520. Storage subsystem 580 includes storage device(s) 584, which can be or include any conventional medium for storing large amounts of data in a nonvolatile manner, such as one or more magnetic, solid state, or optical based disks, or a combination. Storage 584 holds code or instructions and data 586 in a persistent state (e.g., the value is retained despite interruption of power to system 500). Storage 584 can be generically considered to be a "memory," although memory 530 is typically the executing or operating memory to provide instructions to processor 510. Whereas storage 584 is nonvolatile, memory 530 can include volatile memory (e.g., the value or state of the data is indeterminate if power is interrupted to system 500). In one example, storage subsystem 580 includes controller 582 to interface with storage 584. In one example controller 582 is a physical part of interface 514 or processor 510 or can include circuits or logic in both processor 510 and interface 514.

A volatile memory is memory whose state (and therefore the data stored in it) is indeterminate if power is interrupted to the device. Dynamic volatile memory requires refreshing the data stored in the device to maintain state. One example of dynamic volatile memory includes DRAM (Dynamic Random Access Memory), or some variant such as Synchronous DRAM (SDRAM). A memory subsystem as described herein may be compatible with a number of memory technologies, such as DDR3 (Double Data Rate version 3, original release by JEDEC (Joint Electronic Device Engineering Council) on Jun. 27, 2007). DDR4 (DDR version 4, initial specification published in September 2012 by JEDEC), DDR4E (DDR version 4), LPDDR3 (Low Power DDR version3, JESD209-3B, August 2013 by JEDEC), LPDDR4) LPDDR version 4, JESD209-4, originally published by JEDEC in August 2014), WIO2 (Wide Input/output version 2, JESD229-2 originally published by JEDEC in August 2014, HBM (High Bandwidth Memory, JESD325, originally published by JEDEC in October 2013, LPDDR5 (currently in discussion by JEDEC), HBM2 (HBM version 2), currently in discussion by JEDEC, or others or combinations of memory technologies, and technologies based on derivatives or extensions of such specifications. The JEDEC standards are available at www.jedec.org.

A non-volatile memory (NVM) device is a memory whose state is determinate even if power is interrupted to the device. In one embodiment, the NVM device can comprise a block addressable memory device, such as NAND technologies, or more specifically, multi-threshold level NAND flash memory (for example, Single-Level Cell ("SLC"), Multi-Level Cell ("MLC"), Quad-Level Cell ("QLC"), Tri-Level Cell ("TLC"), or some other NAND). A NVM device can also comprise a byte-addressable write-in-place three dimensional cross point memory device, or other byte addressable write-in-place NVM device (also referred to as persistent memory), such as single or multi-level Phase Change Memory (PCM) or phase change memory with a switch (PCMS), NVM devices that use chalcogenide phase change material (for example, chalcogenide glass), resistive memory including metal oxide base, oxygen vacancy base and Conductive Bridge Random Access Memory (CB-RAM), nanowire memory, ferroelectric random access memory (FeRAM, FRAM), magneto resistive random access memory (MRAM) that incorporates memristor technology, spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

A power source (not depicted) provides power to the components of system 500. More specifically, power source typically interfaces to one or multiple power supplies in system 500 to provide power to the components of system 500. In one example, the power supply includes an AC to DC (alternating current to direct current) adapter to plug into a wall outlet. Such AC power can be renewable energy (e.g., solar power) power source. In one example, power source includes a DC power source, such as an external AC to DC converter. In one example, power source or power supply includes wireless charging hardware to charge via proximity to a charging field. In one example, power source can include an internal battery, alternating current supply, motion-based power supply, solar power supply, or fuel cell source.

In an example, system 500 can be implemented using interconnected compute sleds of processors, memories, storages, network interfaces, and other components. High speed interconnects can be used such as: Ethernet (IEEE 802.3), remote direct memory access (RDMA), InfiniBand, Internet Wide Area RDMA Protocol (iWARP), quick UDP Internet Connections (QUIC), RDMA over Converged Ethernet (RoCE), Peripheral Component Interconnect express (PCIe), Intel QuickPath Interconnect (QPI), Intel Ultra Path Interconnect (UPI), Intel On-Chip System Fabric (IOSF), Omnipath, Compute Express Link (CXL), HyperTransport, high-speed fabric, NVLink, Advanced Microcontroller Bus Architecture (AMBA) interconnect, OpenCAPI, Gen-Z, Cache Coherent Interconnect for Accelerators (CCIX), 3GPP Long Term Evolution (LTE) (4G), 3GPP 5G, and variations thereof. Data can be copied or stored to virtualized storage nodes using a protocol such as NVMe over Fabrics (NVMe-oF) or NVMe.

Embodiments herein may be implemented in various types of computing and networking equipment, such as switches, routers, racks, and blade servers such as those employed in a data center and/or server farm environment. The servers used in data centers and server farms comprise arrayed server configurations such as rack-based servers or blade servers. These servers are interconnected in communication via various network provisions, such as partitioning sets of servers into Local Area Networks (LANs) with appropriate switching and routing facilities between the LANs to form a private Intranet. For example, cloud hosting facilities may typically employ large data centers with a multitude of servers. A blade comprises a separate computing platform that is configured to perform server-type functions, that is, a "server on a card." Accordingly, each blade includes components common to conventional servers, including a main printed circuit board (main board) providing internal wiring (e.g., buses) for coupling appropriate integrated circuits (ICs) and other components mounted to the board.

Figure 6:
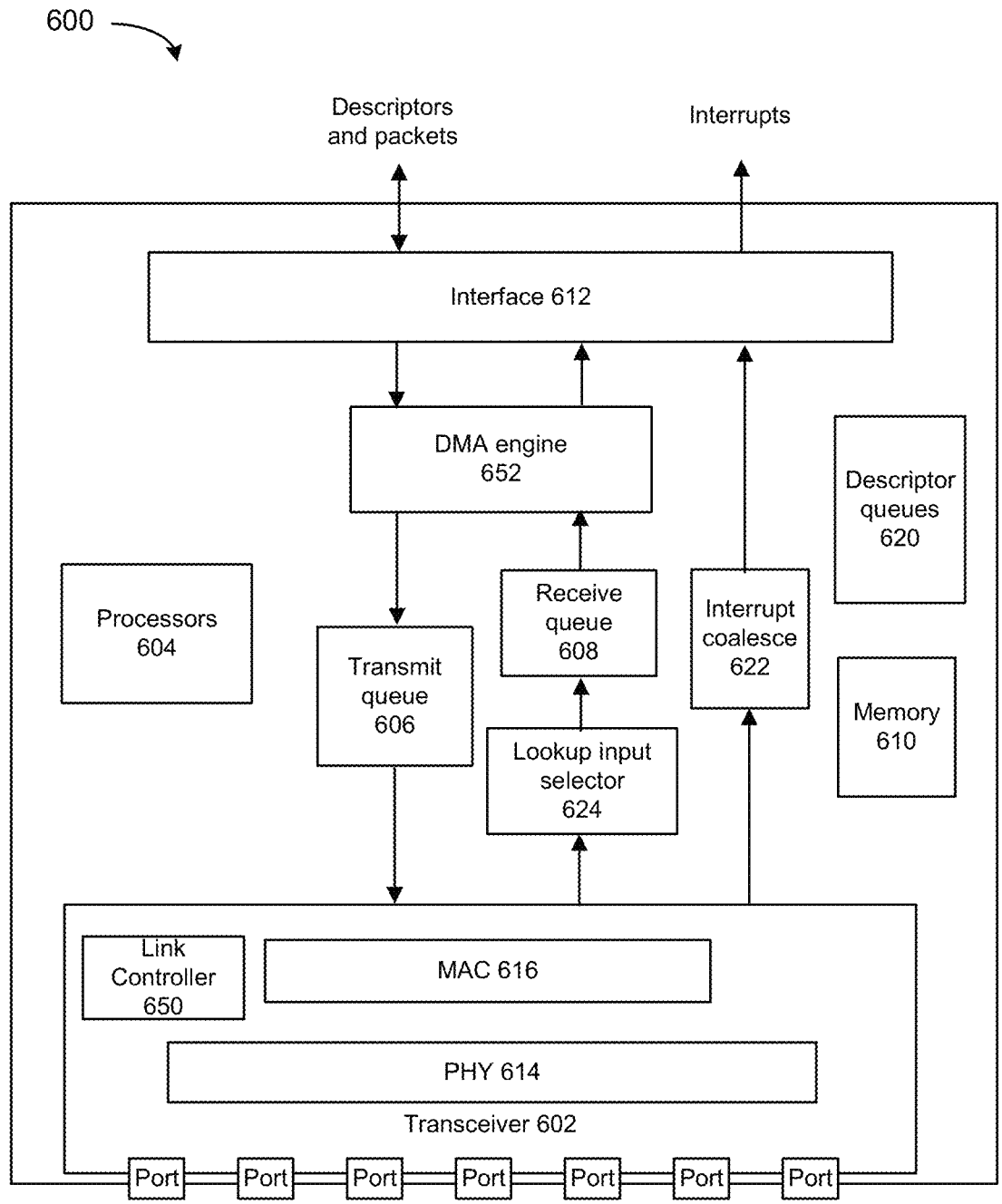
FIG. 6 depicts a network interface.

FIG. 6 depicts a network interface. The network interface can use embodiments described herein to configure a network interface or switch to select a manner of attempting to link with another device in accordance with embodiments described herein. Transceiver 602 can be capable of receiving and transmitting packets in conformance with the applicable protocols such as Ethernet as described in IEEE 802.3, although other protocols may be used. Transceiver 602 can receive and transmit packets from and to a network via a network medium (not depicted). Transceiver 602 can include PHY circuitry 614 and media access control (MAC) circuitry 616. PHY circuitry 614 can include encoding and decoding circuitry (not shown) to encode and decode data packets according to applicable physical layer specifications or standards. MAC circuitry 616 can be configured to assemble data to be transmitted into packets, that include destination and source addresses along with network control information and error detection hash values.

In accordance with some embodiments, link controller 650 controls auto negotiation and link establishment with one or more link partners to determine link speed, FEC modes and pause capabilities. Link partners can be host devices, modules (e.g., optical communication modules), or other communications chips. In some examples, link controller 650 can be firmware implemented into MAC circuitry 616 or available for use by MAC circuitry 616.

Processors 604 can be any combination of a: processor, core, graphics processing unit (GPU), field programmable gate array (FPGA), application specific integrated circuit (ASIC), or other programmable hardware device that allow programming of network interface 600. For example, processors 604 can provide for identification of a resource to use to perform a workload and generation of a bitstream for execution on the selected resource. For example, a "smart network interface" can provide packet processing capabilities in the network interface using processors 604.

Packet allocator 624 can provide distribution of received packets for processing by multiple CPUs or cores using timeslot allocation described herein or RSS. When packet allocator 624 uses RSS, packet allocator 624 can calculate a hash or make another determination based on contents of a received packet to determine which CPU or core is to process a packet.

Interrupt coalesce 622 can perform interrupt moderation whereby network interface interrupt coalesce 622 waits for multiple packets to arrive, or for a time-out to expire, before generating an interrupt to host system to process received packet(s). Receive Segment Coalescing (RSC) can be performed by network interface 600 whereby portions of incoming packets are combined into segments of a packet. Network interface 600 provides this coalesced packet to an application.

Direct memory access (DMA) engine 652 can copy a packet header, packet payload, and/or descriptor directly from host memory to the network interface or vice versa, instead of copying the packet to an intermediate buffer at the host and then using another copy operation from the intermediate buffer to the destination buffer.

Memory 610 can be any type of volatile or non-volatile memory device and can store any queue or instructions used to program network interface 600. Transmit queue 606 can include data or references to data for transmission by network interface. Receive queue 608 can include data or references to data that was received by network interface from a network. Descriptor queues 620 can include descriptors that reference data or packets in transmit queue 606 or receive queue 608. Bus interface 612 can provide an interface with host device (not depicted). For example, bus interface 612 can be compatible with PCI, PCI Express, PCI-x, Serial ATA, and/or USB compatible interface (although other interconnection standards may be used).

Figure 7:
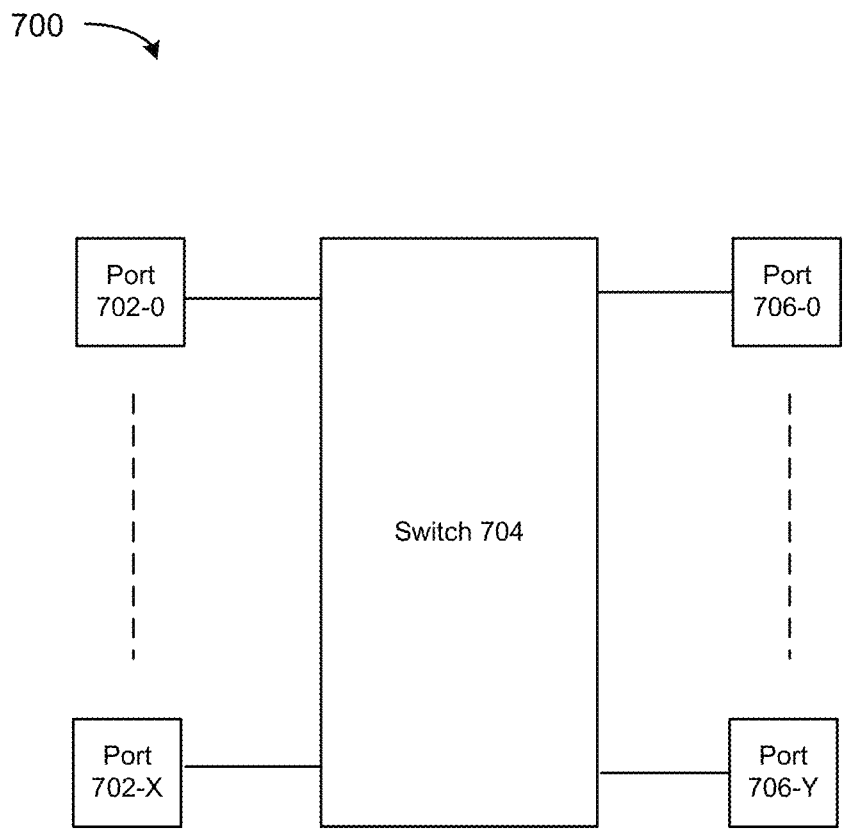
FIG. 7 depicts a switch.

FIG. 7 depicts a switch. Various embodiments can be used in or with the switch of FIG. 7 achieve link status with one or more other devices. Switch 704 can route packets or frames of any format or in accordance with any specification from any port 702-0 to 702-X to any of ports 706-0 to 706-Y (or vice versa). Any of ports 702-0 to 702-X can be connected to a network of one or more interconnected devices. Similarly, any of ports 706-0 to 706-X can be connected to a network of one or more interconnected devices. Switch 704 can decide which port to transfer packets or frames to using a table that maps packet characteristics with an associated output port. In addition, switch 704 can perform packet replication for forwarding of a packet or frame to multiple ports and queuing of packets or frames prior to transfer to an output port.

Figure 8:
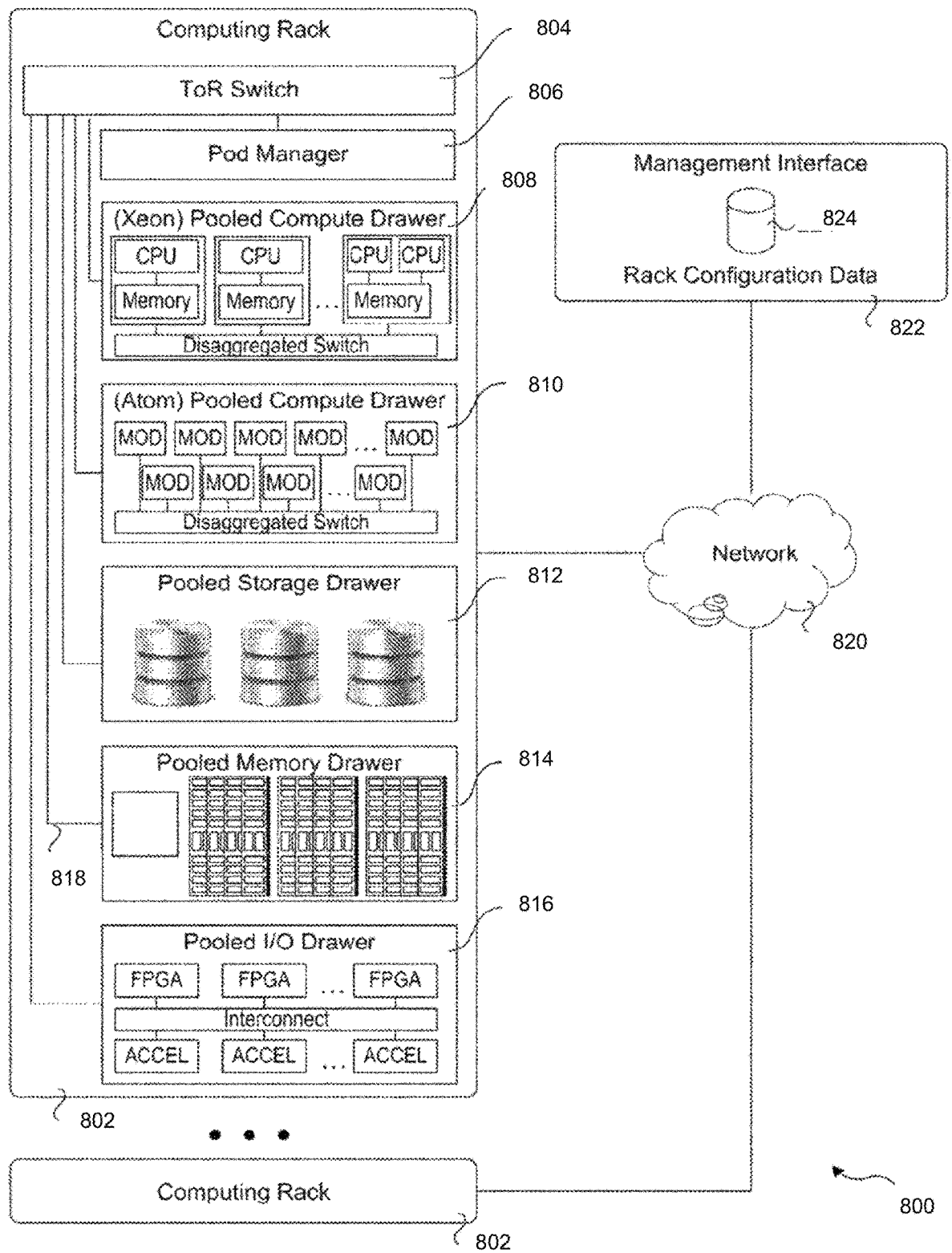
FIG. 8 depicts an environment.

FIG. 8 depicts an environment 800 includes multiple computing racks 802, each including a Top of Rack (ToR) switch 804, a pod manager 806, and a plurality of pooled system drawers. Generally, the pooled system drawers may include pooled compute drawers and pooled storage drawers. Optionally, the pooled system drawers may also include pooled memory drawers and pooled Input/Output (I/O) drawers. In the illustrated embodiment the pooled system drawers include an Intel® XEON® pooled computer drawer 808, and Intel® ATOM™ pooled compute drawer 810, a pooled storage drawer 812, a pooled memory drawer 814, and a pooled I/O drawer 816. Each of the pooled system drawers is connected to ToR switch 804 via a high-speed link 818, such as a 40 Gigabit/second (Gb/s) or 100 Gb/s Ethernet link or a 100+Gb/s Silicon Photonics (SiPh) optical link. In one embodiment high-speed link 818 comprises an 800 Gb/s SiPh optical link.

Multiple of the computing racks 802 may be interconnected via their ToR switches 804 (e.g., to a pod-level switch or data center switch), as illustrated by connections to a network 820. In some embodiments, groups of computing racks 802 are managed as separate pods via pod manager(s) 806. In one embodiment, a single pod manager is used to manage all of the racks in the pod. Alternatively, distributed pod managers may be used for pod management operations.

Environment 800 further includes a management interface 822 that is used to manage various aspects of the environment. This includes managing rack configuration, with corresponding parameters stored as rack configuration data 824.

In some examples, network interface and other embodiments described herein can be used in connection with a base station (e.g., 3G, 4G, 5G and so forth), macro base station (e.g., 5G networks), picostation (e.g., an IEEE 802.11 compatible access point), nanostation (e.g., for Point-to-MultiPoint (PtMP) applications).

For example, various embodiments can be used for wired or wireless protocols (e.g., 3GPP Long Term Evolution (LTE) (4G) or 3GPP 5G), on-premises data centers, off-premises data centers, base station devices, sensor data sender or receiver devices (e.g., for autonomous vehicles or augmented reality applications), endpoint devices, servers, routers, edge network elements (computing elements provided physically closer to a base station or network access point than a data center), fog network elements (computing elements provided physically closer to a base station or network access point than a data center but further from an edge network), and/or hybrid data centers (e.g., data center that use virtualization, cloud and software-defined networking to deliver application workloads across physical data centers and distributed multi-cloud environments). Network or computing elements can be used in local area network (LAN), metropolitan area network (MAN), network with devices connected using optical fiber links, campus area network (CAN), or wide area network (WAN).

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASICs, PLDs, DSPs, FPGAs, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, APIs, instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation. A processor can be one or more combination of a hardware state machine, digital control logic, central processing unit, or any hardware, firmware and/or software elements.

Some examples may be implemented using or as an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

The appearances of the phrase "one example" or "an example" are not necessarily all referring to the same example or embodiment. Any aspect described herein can be combined with any other aspect or similar aspect described herein, regardless of whether the aspects are described with respect to the same figure or element. Division, omission or inclusion of block functions depicted in the accompanying figures does not infer that the hardware components, circuits, software and/or elements for implementing these functions would necessarily be divided, omitted, or included in embodiments.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The terms "first," "second," and the like, herein do not denote any order, quantity, or importance, but rather are used to distinguish one element from another. The terms "a" and "an" herein do not denote a limitation of quantity, but rather denote the presence of at least one of the referenced items. The term "asserted" used herein with reference to a signal denote a state of the signal, in which the signal is active, and which can be achieved by applying any logic level either logic 0 or logic 1 to the signal. The terms "follow" or "after" can refer to immediately following or following after some other event or events. Other sequences of operations may also be performed according to alternative embodiments. Furthermore, additional operations may be added or removed depending on the particular applications. Any combination of changes can be used and one of ordinary skill in the art with the benefit of this disclosure would understand the many variations, modifications, and alternative embodiments thereof.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z.'"

Illustrative examples of the devices, systems, and methods disclosed herein are provided below. An embodiment of the devices, systems, and methods may include any one or more, and any combination of, the examples described below.

An example includes a link partner that includes receives interleaved or alternating an auto-negotiation attempt with a non-auto-negotiation mode. The link partner can be a network interface that supports IEEE 802.3 Auto-Negotiation, non-standard link mode, or non-specification compliant FEC mode configurations.

Example 1 includes a network interface apparatus comprising: an interface to a medium and a controller to attempt to form a link with another device through the interface, wherein to attempt to form a link with another device through the interface, the controller is to: alternate use of IEEE 802.3 auto-negotiation with at least one attempt to form a link using a non-auto-negotiated mode that specifies forward error correction (FEC) mode.

Example 2 includes any example, wherein IEEE 802.3 auto-negotiation comprises IEEE 802.3 compatible auto-negotiation compatible with Clause 73 and permits use of Next Pages.

Example 3 includes any example, wherein to alternate use of IEEE 802.3 auto-negotiation with at least one attempt to form a link using a non-auto-negotiated mode, the controller is to: based on failure to achieve link using a last successful configuration, apply IEEE 802.3 auto-negotiation prior to at least one attempt to form a link with the another device using a selected link speed mode and/or forward error correction (FEC) scheme.

Example 4 includes any example, wherein to alternate use of IEEE 802.3 auto-negotiation with at least one attempt to form a link using a non-auto-negotiated mode, the controller is to: apply IEEE 802.3 auto-negotiation prior to at least one attempt to form a link with the another device using a selected link speed mode and/or forward error correction (FEC) scheme and based on failure of IEEE 802.3 auto-negotiation and selected link speed mode and/or FEC scheme to achieve link with the another device, select and apply a next available link speed and FEC scheme wherein the next available link speed and/or FEC scheme comprises one or more of: a lower link speed or lower FEC coding gain.

Example 5 includes any example, wherein the controller is to: based on failure to achieve link with the another device using available link speed mode and/or forward error correction (FEC) schemes, attempt IEEE 802.3 auto-negotiation without use of Next Pages.

Example 6 includes any example, wherein the controller is to: based on failure to achieve link with the another device using IEEE 802.3 compatible auto-negotiation, apply use auto-negotiation without use of Next Pages, lengthen an amount of time permitted in a subsequent attempt to achieve link with the another device using IEEE 802.3 compatible auto-negotiation.

Example 7 includes any example, wherein the non-auto-negotiated modes comprise at least one link speed and at least one forward error correction (FEC) mode.

Example 8 includes any example, wherein the at least one FEC mode comprises one or more of: FEC disabled, IEEE 802.3 Clause 74 Firecode FEC, IEEE 802.3 Clause 91 Reed Solomon FEC, IEEE 802.3 Clause 108 Reed Solomon FEC, Consortium Low Latency Reed Solomon FEC.

Example 9 includes any example, wherein the interface comprises a physical layer interface.

Example 10 includes any example, wherein the another device comprises one or more of: an optical module, a retimer circuit, a physical medium dependent (PMD) device, or a physical coding sublayer (PCS) device.

Example 11 includes any example, and includes one or more of: switch, router, a media access controller (MAC), or packet processing device.

Example 12 includes any example, and includes one or more of: rack, server, or data center.

Example 13 includes a method that includes: attempting to achieve link status with another device using IEEE 802.3 compatible auto-negotiation and based on failure to achieve link status using IEEE 802.3 compatible auto-negotiation with the another device, attempting to achieve link status using at least one non-auto-negotiated modes interleaved with use of IEEE 802.3 compatible auto-negotiation.

Example 14 includes any example, wherein IEEE 802.3 compatible auto-negotiation comprises IEEE 802.3 compatible auto-negotiation compatible with Clause 73 with use of Next Pages.

Example 15 includes any example, wherein attempting to achieve link status using at least one non-auto-negotiated modes alternated with use of IEEE 802.3 compatible auto-negotiation comprises: based on failure to achieve link using a last successful configuration, applying IEEE 802.3 compatible auto-negotiation prior to at least one attempt to form a link with the another device using a selected link speed mode and/or forward error correction (FEC) scheme.

Example 16 includes any example, and includes based on failure of IEEE 802.3 compatible auto-negotiation and selected link speed mode and FEC scheme to achieve link with the another device, selecting and applying a next available link speed and/or FEC scheme where the next available link speed and/or FEC scheme comprises one or more of: a lower link speed or lower FEC coding gain.

Example 17 includes any example, wherein the at least one FEC scheme comprises one or more of: FEC disabled, IEEE 802.3 Clause 74 Firecode FEC, IEEE 802.3 Clause 91 Reed Solomon FEC, IEEE 802.3 Clause 108 Reed Solomon FEC, Consortium Low Latency Reed Solomon FEC.

Example 18 includes any example, and includes based on failure to achieve link with the another device using available link speed mode and/or forward error correction (FEC) schemes, attempting IEEE 802.3 compatible auto-negotiation without use of Next Pages.

Example 19 includes at least one computer-readable medium comprising instructions stored thereon, that if executed by at least one processor, cause the at least one processor to: configure a network interface to attempt to form a link with another device by interleaving use of IEEE 802.3 compatible auto-negotiation with at least one attempt to form a link using non-auto-negotiated modes.

Example 20 includes any example and includes one of more of: a driver or firmware.

What is claimed is:

1. A network interface apparatus comprising:
an interface to a medium and
circuitry is to attempt to establish a link with another device through the interface, wherein to attempt to establish the link with another device through the interface, the circuitry is to:
perform at least one Institute of Electrical and Electronics Engineers (IEEE) 802.3 auto-negotiation to attempt to establish the link with the another device;
based on failure to establish the link using IEEE 802.3 auto-negotiation, perform at least one attempt to establish the link based on a first link speed and a forward error correction (FEC) mode with a first FEC coding gain; and
based on a second failure to establish the link, perform at least one attempt to establish the link based on a second link speed and an FEC mode with a second FEC coding gain, wherein the second FEC coding code is lower than the first FEC coding gain.

2. The apparatus of claim 1, wherein IEEE 802.3 auto-negotiation comprises IEEE 802.3 compatible auto-negotiation compatible with Clause 73 and permits use of Next Pages.

3. The apparatus of claim 1, wherein the circuitry is to:
based on failure to establish the link using a last successful configuration, perform the IEEE 802.3 auto-negotiation.

4. The apparatus of claim 1, wherein the circuitry is to:
based on failure to establish the link with the another device using IEEE 802.3 auto-negotiation and the first link speed and the FEC mode with the first FEC coding gain, attempt to establish the link by IEEE 802.3 auto-negotiation without use of Next Pages.

5. The apparatus of claim 4, wherein the circuitry is to:
based on failure to establish the link with the another device using IEEE 802.3 compatible auto-negotiation without use of Next Pages, lengthen an amount of time permitted in a subsequent attempt to establish the link with the another device using IEEE 802.3 compatible auto-negotiation.

6. The apparatus of claim 1, wherein the FEC mode comprises one or more of: FEC disabled, IEEE 802.3 Clause 74 Firecode FEC, IEEE 802.3 Clause 91 Reed Solomon FEC, IEEE 802.3 Clause 108 Reed Solomon FEC, or Consortium Low Latency Reed Solomon FEC.

7. The apparatus of claim 1, wherein the interface comprises a physical layer interface.

8. The apparatus of claim 1, wherein the another device comprises one or more of: a network interface, a switch, an optical module, a retimer circuit, a physical medium dependent (PMD) device, or a physical coding sublayer (PCS) device.

9. The apparatus of claim 1, further comprising one or more of: switch, router, a media access controller (MAC), or packet processing device.

10. The apparatus of claim 1, further comprising one or more of: rack, server, or data center.

11. The apparatus of claim 1, wherein the circuitry is to:
based on failure to form the link with the another device through the interface based on the first link speed and the first FEC coding gain, perform another at least one IEEE 802.3 auto-negotiation to attempt to establish the link.

12. The apparatus of claim 1, wherein the perform at least one attempt to establish the link based on the first link speed and the forward error correction (FEC) mode with a first FEC coding gain comprises utilization of a non-auto-negotiated Attachment Unit Interface (AUI) link mode.

13. A method comprising:
attempting to establish link status with another device using Institute of Electrical and Electronics Engineers (IEEE) 802.3 link auto-negotiation and based on failure to establish link status using auto-negotiation with the another device, attempting to establish link status based on a non-auto-negotiated Attachment Unit Interface (AUI) link mode using at least one link speed and at least one forward error correction (FEC) mode.

14. The method of claim 13, wherein :
the attempting to establish link status with the another device using IEEE 802.3 link auto-negotiation is based on failure to establish link status using a last successful configuration.

15. The method of claim 14, comprising:
selecting and applying a next available link speed or FEC mode, wherein the next available link speed comprises a lower link speed and the FEC mode comprises a lower FEC coding gain.

16. The method of claim 13, wherein the at least one FEC mode comprises one or more of: FEC disabled, IEEE 802.3 Clause 74 Firecode FEC, IEEE 802.3 Clause 91 Reed Solomon FEC, IEEE 802.3 Clause 108 Reed Solomon FEC, or Consortium Low Latency Reed Solomon FEC.

17. The method of claim 13, comprising :
based on failure to establish the link with the another device using available link speed modes and FEC modes, attempting link auto-negotiation without use of Next Pages.

18. At least one non-transitory computer-readable medium comprising instructions stored thereon, that if executed by at least one processor, cause the at least one processor to:
configure a network interface to attempt to establish a link with another device by interleaving use of IEEE 802.3 compatible auto-negotiation with at least one attempt to establish a link using at least one link speed and at least one forward error correction (FEC) mode of a non-auto-negotiated link mode.

19. The at least one computer-readable medium of claim 18, wherein one of more of a driver or firmware is to perform the configure the network interface to attempt to establish the link with another device by interleaving use of IEEE 802.3 compatible auto-negotiation with at least one attempt to establish the link using at least one link speed and at least one forward error correction (FEC) mode.

20. The at least one computer-readable medium of claim 18, wherein the interleaving use of IEEE 802.3 compatible auto-negotiation with at least one attempt to establish the link using at least one link speed and at least one forward error correction (FEC) mode comprises performing at least one use of IEEE 802.3 compatible auto-negotiation and at least one attempt to establish the link using at least one link speed and at least one FEC mode of a non-auto-negotiated Attachment Unit Interface (AUI) link mode.

* * * * *